(12) United States Patent
Jones et al.

(10) Patent No.: US 12,517,092 B2
(45) Date of Patent: Jan. 6, 2026

(54) DOWNHOLE STATUS DETECTION USING VIBRATION

(71) Applicant: Halliburton Energy Services, Inc., Houston, TX (US)

(72) Inventors: Christopher Michael Jones, Katy, TX (US); Freeman Lee Hill, Houston, TX (US); Xiang Wu, Singapore (SG); Ahmed Fouda, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 133 days.

(21) Appl. No.: 18/075,739

(22) Filed: Dec. 6, 2022

(65) Prior Publication Data

US 2024/0183825 A1 Jun. 6, 2024

(51) Int. Cl.
*E21B 47/00* (2012.01)
*E21B 28/00* (2006.01)
*E21B 47/005* (2012.01)
*G01B 17/02* (2006.01)
*G01N 29/09* (2006.01)
*G01N 29/12* (2006.01)
(Continued)

(52) U.S. Cl.
CPC ............ *G01N 29/09* (2013.01); *E21B 28/00* (2013.01); *E21B 47/005* (2020.05); *G01B 17/02* (2013.01); *G01N 29/12* (2013.01); *G01N 29/223* (2013.01); *G01N 29/2418* (2013.01); *G01N 2291/0232* (2013.01); *G01N 2291/02854* (2013.01)

(58) Field of Classification Search
CPC ........ E21B 47/00; E21B 47/007; E21B 49/00; E21B 47/005; E21B 47/07; E21B 47/135; E21B 28/00; G01V 1/46; G01V 1/50; G01V 2210/1429; G01V 2210/1299; G01V 2210/642; G01D 5/35364; G01K 11/32; G01N 29/09; G01N 29/12; G01N 29/223; G01N 29/2418; G01N 2291/0232; G01N 2291/02854; G01B 17/02
See application file for complete search history.

(56) References Cited

U.S. PATENT DOCUMENTS 3,828,867 A * 8/1974 Elwood ................... E21B 47/04
175/45
5,214,251 A * 5/1993 Orban ................... E21B 47/107
367/27
(Continued)

OTHER PUBLICATIONS

PCT/US2022/052094, "International Search Report and Written Opinion", Aug. 21, 2023, 11 pages.

*Primary Examiner* — Edwin J Toledo-Duran
(74) *Attorney, Agent, or Firm* — Kilpatrick Townsend & Stockton LLP (57) ABSTRACT

A system can be provided that can include a measurement tool that can be coupled to a conveyance mechanism for positioning the measurement tool downhole in a wellbore. The wellbore can be encased by a tubular. The system can further include a vibration-inducing device that can cause the tubular to vibrate. Additionally, the system can include an interferometer coupled to the measurement tool for detecting the vibration in the tubular. The system can further generate data useable to determine at least one status of the tubular and at least one status of a cement layer. The cement layer can be positioned between the tubular and a subterranean formation surrounding the wellbore.

20 Claims, 7 Drawing Sheets

(51) Int. Cl.
  *G01N 29/22* (2006.01)
  *G01N 29/24* (2006.01)

(56) References Cited

U.S. PATENT DOCUMENTS

| | | | | |
|---|---|---|---|---|
| 11,181,656 B2* | 11/2021 | Syresin | | G01V 1/50 |
| 11,199,083 B2* | 12/2021 | Aniket | | E21B 47/00 |
| 11,549,369 B1* | 1/2023 | LeBlanc | | G01L 1/242 |
| 12,265,062 B2* | 4/2025 | Ge | | E21B 47/005 |
| 12,297,733 B2* | 5/2025 | Wang | | E21B 47/107 |
| 2003/0018433 A1* | 1/2003 | Blanch | | G01V 1/48 |
| | | | | 702/14 |
| 2003/0094281 A1* | 5/2003 | Tubel | | G01V 8/16 |
| | | | | 166/250.03 |
| 2003/0174581 A1* | 9/2003 | Parra | | G01V 1/44 |
| | | | | 73/152.58 |
| 2005/0241825 A1* | 11/2005 | Burris, II | | E21B 43/119 |
| | | | | 166/120 |
| 2006/0070433 A1* | 4/2006 | Fredette | | E21B 47/085 |
| | | | | 73/152.58 |
| 2006/0157239 A1* | 7/2006 | Ramos | | E21B 47/135 |
| | | | | 166/254.2 |
| 2006/0233048 A1* | 10/2006 | Froelich | | E21B 47/005 |
| | | | | 367/35 |
| 2009/0326826 A1* | 12/2009 | Hull | | E21B 47/103 |
| | | | | 702/12 |
| 2011/0090496 A1* | 4/2011 | Samson | | G01D 5/35364 |
| | | | | 356/301 |
| 2012/0075951 A1* | 3/2012 | Johnson | | G01V 1/46 |
| | | | | 367/32 |
| 2012/0272743 A1* | 11/2012 | Sun | | G01N 29/07 |
| | | | | 73/784 |
| 2013/0021874 A1* | 1/2013 | Hartog | | G01V 1/226 |
| | | | | 367/31 |
| 2013/0229286 A1* | 9/2013 | Sanchez | | E21B 47/117 |
| | | | | 340/853.1 |
| 2013/0341008 A1* | 12/2013 | Brady | | E21B 47/103 |
| | | | | 166/250.01 |
| 2014/0043938 A1* | 2/2014 | Sinha | | G01V 1/50 |
| | | | | 367/31 |
| 2014/0110124 A1* | 4/2014 | Goldner | | E21B 47/117 |
| | | | | 166/337 |
| 2014/0150548 A1* | 6/2014 | Childers | | G01V 1/226 |
| | | | | 73/152.54 |
| 2014/0177389 A1* | 6/2014 | Bolshakov | | G01V 1/50 |
| | | | | 367/35 |
| 2015/0034311 A1* | 2/2015 | Tunget | | E21B 47/12 |
| | | | | 166/250.14 |
| 2015/0168581 A1* | 6/2015 | Izuhara | | E21B 47/005 |
| | | | | 702/9 |
| 2016/0018548 A1* | 1/2016 | McCafferty | | E21B 47/0025 |
| | | | | 702/6 |
| 2016/0131520 A1* | 5/2016 | Martin | | G01H 9/004 |
| | | | | 73/597 |
| 2016/0161631 A1* | 6/2016 | Jaaskelainen | | G01V 1/42 |
| | | | | 356/72 |
| 2016/0265348 A2* | 9/2016 | Chen | | E21B 47/16 |
| 2016/0349403 A1* | 12/2016 | Farhadiroushan | | G01N 21/68 |
| 2017/0102226 A1 | 4/2017 | Chilukuri et al. | | |
| 2017/0108615 A1* | 4/2017 | Cooper | | G01V 11/002 |
| 2017/0114627 A1* | 4/2017 | Mandal | | E21B 47/005 |
| 2017/0226844 A1* | 8/2017 | Izuhara | | E21B 47/005 |
| 2017/0248008 A1 | 8/2017 | Brady et al. | | |
| 2017/0299758 A1* | 10/2017 | Pelletier | | E21B 47/005 |
| 2017/0350231 A1* | 12/2017 | Merciu | | G01V 1/50 |
| 2018/0003845 A1* | 1/2018 | Sakiyama | | E21B 47/085 |
| 2018/0058196 A1* | 3/2018 | Jaaskelainen | | E21B 47/14 |
| 2018/0149019 A1* | 5/2018 | Bose | | G01V 1/50 |
| 2018/0284308 A1* | 10/2018 | Hirabayashi | | G01V 1/50 |
| 2018/0305993 A1* | 10/2018 | Perkins | | E21B 47/00 |
| 2018/0328170 A1* | 11/2018 | Jaaskelainen | | E21B 47/07 |
| 2019/0017369 A1* | 1/2019 | Ameen | | G01V 1/46 |
| 2019/0369285 A1* | 12/2019 | Fouda | | G01V 3/10 |
| 2019/0376380 A1* | 12/2019 | Zhang | | E21B 47/005 |
| 2020/0033494 A1* | 1/2020 | Patterson | | E21B 49/00 |
| 2020/0072036 A1* | 3/2020 | Wang | | G01N 29/46 |
| 2020/0116007 A1* | 4/2020 | Mandal | | E21B 47/005 |
| 2020/0141225 A1* | 5/2020 | Aniket | | E21B 47/00 |
| 2020/0182042 A1* | 6/2020 | Pearl, Jr. | | E21B 33/14 |
| 2021/0018643 A1* | 1/2021 | Ulrich, II | | E21B 47/00 |
| 2021/0041595 A1 | 2/2021 | Rodney et al. | | |
| 2021/0189874 A1* | 6/2021 | Jaaskelainen | | E21B 47/135 |
| 2021/0238981 A1* | 8/2021 | Maida, Jr. | | E21B 33/14 |
| 2021/0310342 A1* | 10/2021 | Marsala | | E21B 47/0224 |
| 2021/0396126 A1* | 12/2021 | Wang | | E21B 47/0228 |
| 2021/0396900 A1* | 12/2021 | Wang | | E21B 49/00 |
| 2022/0341307 A1* | 10/2022 | Kalyanraman | | E21B 47/005 |
| 2022/0381935 A1* | 12/2022 | Cabella | | E21B 47/107 |
| 2023/0175386 A1* | 6/2023 | Ge | | G01V 1/50 |
| | | | | 367/35 |
| 2023/0393099 A1* | 12/2023 | Ge | | E21B 47/14 |

\* cited by examiner

DOWNHOLE STATUS DETECTION USING VIBRATION

TECHNICAL FIELD

The present disclosure relates generally to wellbore operations and, more particularly (although not necessarily exclusively), to evaluating a tubular in a wellbore using vibration.

BACKGROUND

A well system can include a wellbore that can be formed in a subterranean formation for extracting produced hydrocarbon or other suitable material. A wellbore operation can be performed to extract the produced hydrocarbon material or perform other suitable tasks relating to the wellbore. During the wellbore operation, a tubular, such as a casing string, a production string, surface piping, or the like, can be used to perform or facilitate the wellbore operation. The tubular may be exposed to harsh conditions that may degrade the tubular over time or may otherwise affect the integrity of the tubular.

DETAILED DESCRIPTION

Certain aspects and examples of the present disclosure relate to causing a tubular to vibrate and detecting the vibrations to evaluate the tubular and a cement layer associated with the tubular. The tubular can be pipe associated with drilling a wellbore, casing the wellbore, producing fluids in the wellbore, or other suitable wellbore operations. Examples of tubulars may include drill pipe, surface pipe, casing, production tubing, pipeline, etc. The cement layer can be provided in an annulus between the tubular and a subterranean formation surrounding the wellbore. The cement layer can seal the annulus and maintain a position of the tubular in the wellbore. A vibration-inducing device can provide an electromagnetic pulse, a mechanical pulse, an acoustic pulse, or other suitable energy pulse or mechanism for causing the tubular to vibrate. For example, a hammer device or a roller device can be used for causing vibration along the tubular via mechanical pulses. Additionally, an electromechanical pulse (EMP) generator can be used as a vibration-inducing device by producing electromagnetic pulses. As another example, an acoustic transducer may transmit acoustic pulses to cause the tubular to vibrate. Additionally, the vibration can be detected using laser interference measurement techniques. Examples of laser interference measurement techniques may include laser distance meters, laser vibrometers, lidar systems, etc. The measurements provided by the laser interference measurement techniques can be used to generate data for evaluating the tubular. The data may indicate deformation or corrosion of the tubular. The data may also indicate a quality of a bond between the cement layer and the tubular.

In some examples of the present disclosure, evaluating the tubular in the wellbore that contains, for example, gas can be improved. Additionally, some examples of the present disclosure can be applied to a wellbore containing any suitable logging fluid. For example, suitable logging fluid can be any clear logging fluid such as a completion brine, or other brine. In an example, the casing may be vibrated by a device producing an electromagnetic pulse, a magnetic pulse, a mechanical pulse, an acoustic pulse, or other suitable energy pulse. Additionally, lasers may be used to detect the vibration of the casing. The lasers can be coupled to a measurement tool that can be positioned downhole in the wellbore. The lasers can be optically directed toward the casing using beam splitters and turning optics. The lasers can be used in laser interference measurement devices to provide laser vibration measurements, laser distancing measurements, or a combination thereof. Laser vibration measurements can be a frequency, amplitude, or other measurement associated with vibration. The laser distancing measurements can be a distance between two objects, such as a laser vibrometer and the tubular. Examples of the laser interference measurement devices can include laser distance meters, laser vibrometers, lidar systems, and the like. The laser distancing measurements may be used to determine or adjust a position of the measurement tool within the wellbore.

In an example, vibration in the tubular can be induced by electromechanical pulses and a laser vibrometer can detect the vibration. The laser vibrometer can be sensitive to a large range of frequencies and the electromagnetic pulses can generate a large range of frequency pulses. The frequencies detected by the laser vibrometer can indicate a thickness of the tubular. Therefore, the laser vibrometer and electromechanical pulses can evaluate tubulars of varying thicknesses. Concentric tubulars can also be evaluated using the laser vibrometer and electromechanical pulses. Additionally, multiple interfaces, such as the cement layer, the wellbore, the subterranean formation, or a combination thereof may be evaluated.

In some examples, the use of laser interference techniques can mitigate an influence of eccentricity and specular reflection on the data obtained from vibration of the tubular. For example, as the laser vibrometer can detect a vibrational wave rather than an acoustic wave, measurements of frequency, amplitude, etc. by the laser vibrometer can be independent of eccentricity and specular reflection. Additionally, the laser distancing measurements can be used to determine a frequency of an electromagnetic pulse or an acoustic pulse based on a distance between the laser vibrometer and the tubular. In some examples, the lasers can be positioned to detect vibration at a correct location. At the correct location measurements can be independent of eccentricity and specular reflection. For example, the correct location can be associated with a phase shift of echoes from the electromagnetic pulse or the acoustic pulse. In some examples, the lasers may be rotated along a window portion of the measurement tool or other suitable portions of the measurement tool to enable detection at the correct location.

In some examples, multiple locations may be monitored along the casing by positioning multiple laser interference measurement devices in the measurement tool. The multiple locations can be monitored for vibration simultaneously. In an example, the multiple location monitoring can be used to deconvolute three dimensional effects of echoes associated with electromagnetic pulses, acoustic pulses, or the like. Additionally, positioning the multiple laser interference measurement devices in the measurement tool may provide high resolution azimuthal monitoring. In some examples, monitoring may be conducted simultaneously along multiple azimuths and across multiple points colinear to the wellbore axis by positioning multiple measurement tools with multiple laser interference measurement devices at different depths in the wellbore. By positioning the multiple measurement tools at different depths, propagation of the vibration along the tubular can be monitored.

Certain examples of the system may be used in low temperature wells including those for gas storage. To apply examples of the system in a higher temperature well, the lasers can be placed in eutectic cooling with optical routing of a laser beam path. Additionally, layered eutectic cooling may be possible with a small package of the laser diodes. In an example, a laser beam may be routed for multiple purposes such as laser ranging at multiple spots along the tubular for accurate eccentricity calculations or for monitoring multiple spots along different depths of the tubular simultaneously. In some examples, the lasers may be inherently temperature robust. Additionally, fibers may transmit the laser beam from a cooler location such as the eutectic cooler or the surface.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
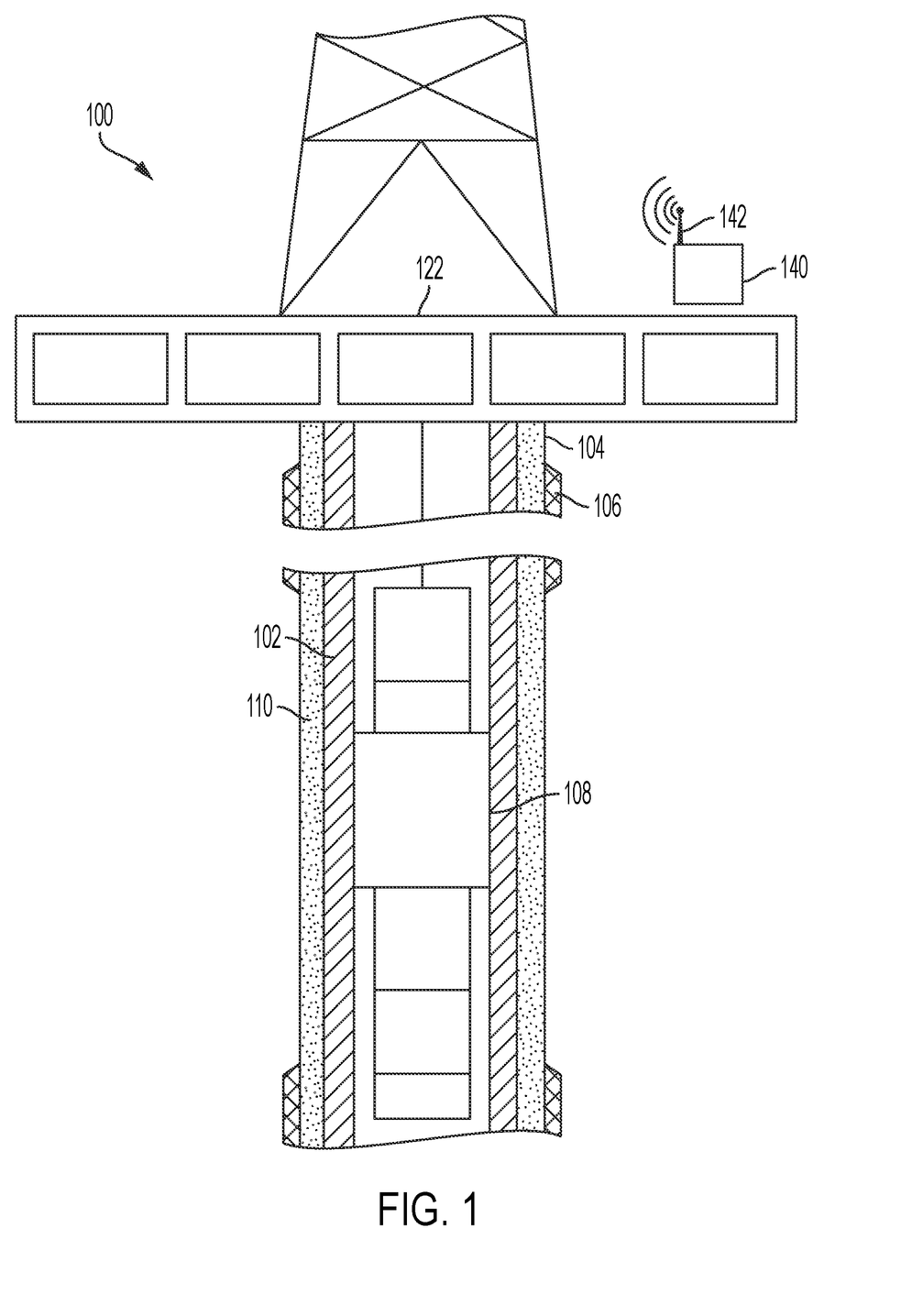
FIG. 1 is a schematic of a well system with a tubular according to one example of the present disclosure.

FIG. 1 is a schematic of a well system 100 with a tubular 102 according to one example of the present disclosure. The well system 100 can include a wellbore 104 that can extend through a subterranean formation 106. The subterranean formation 106 can include hydrocarbon material such as oil, gas, coal, or other suitable material. In some examples, the tubular 102 can extend from a well surface 122 into the subterranean formation 106. The tubular 102 can provide a conduit through which formation fluids, such as production fluids produced from the subterranean formation 106, can travel to the well surface 122. Additionally, the tubular 102 can allow a well tool 108 to be positioned in the wellbore 104 for performing one or more wellbore operations. The tubular 102 can be coupled to walls of the wellbore 104 via cement or other suitable coupling material. For example, a cement layer 110 can be positioned or formed between the tubular 102 and the walls of the wellbore 104 for coupling the tubular 102 to the wellbore 104. The tubular 102 can be coupled to the wellbore 104 using other suitable techniques. Additionally, while illustrated as a downhole tubular, the tubular 102 may instead be or include a surface tubular, such as a pipeline.

In some examples, the tubular 102 can include carbon-based steel or other suitable types of carbon-based steel alloys. Additionally, in an example, the wellbore 104 can include or provide a sour environment that includes water, carbon dioxide, hydrogen sulfide, or any combination thereof. The sour environment may cause the tubular 102 to degrade due to the material, such as the carbon-based steel, of the tubular 102 interacting with the sour environment. Additionally, pressure from the subterranean formation 106 or other suitable environmental characteristics of the subterranean formation 106 may cause deformations in the tubular 102 or may cause degradation of a bond between the tubular 102 and the cement layer 110. Thus, the integrity of the tubular 102 and the quality of the bond between the tubular 102 and the cement layer 110 may be measured, estimated, predicted, or the like to prevent failure of the tubular 102 while positioned with respect to the wellbore 104.

The well system 100 can also include a computing device 140 that can analyze data associated with vibration the tubular 102 to evaluate the tubular 102 with respect to the environment provided by the wellbore 104 or the well system 100. The computing device 140 can be positioned at the well surface 122 of the well system 100. In some examples, the computing device 140 can be positioned downhole in the wellbore 104, remote from the well system 100, or in other suitable locations with respect to the well system 100. The computing device 140 can be communicatively coupled to any suitable component such as the well tool 108, devices embedded in the well tool 108 such as a laser vibrometer, a laser distance meter, etc. For example, as illustrated in FIG. 1, the computing device 140 can include an antenna 142 that can allow the computing device 140 to receive and to send communications relating to the well system 100, the tubular 102, and the like. The computing device 140 can receive data relating to vibration of the tubular 102. The computing device 140 can use the received data to determine a status of the tubular 102, a status of the cement layer 110, or a combination thereof. In some examples, the computing device 140 can output the status of the tubular 102, the status of the cement layer 110, or a combination thereof for use in optimizing the tubular 102 with respect to the well system 100. The design of the tubular 102, the position of the tubular 102, repairs to the tubular 102, and the like can be optimized.

Figure 2:
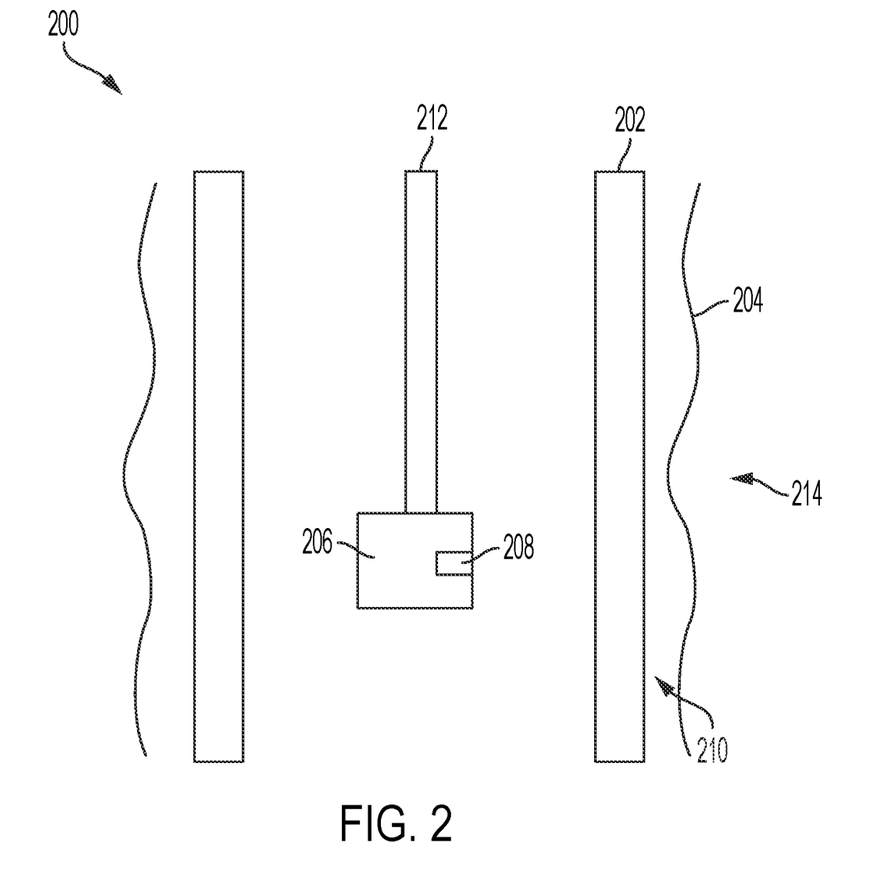
FIG. 2 is a schematic a system for tubular evaluation using vibration according to one example of the present disclosure.

FIG. 2 is a schematic a system for tubular 202 evaluation using vibration according to one example of the present disclosure. The tubular 202 can correspond to the tubular 102 of FIG. 1 and the wellbore 204 can correspond to the wellbore 104 of FIG. 1. As depicted, the tubular 202 can be a downhole tubular that can be positioned in the wellbore 204. The tubular 202 may include a casing string, a tubing string, or the like. The tubular 202 can transport material produced from the wellbore 204, material for use in the wellbore 204, etc. A cement layer 210 can be positioned or formed between the tubular 202 and a subterranean formation 214 for protecting the tubular 202, positioning the tubular 202, coupling the tubular 202 to walls of the wellbore 204, or a combination thereof. The tubular 202 can include a conveyance mechanism 212. The conveyance mechanism 212 may be a cable conveyance mechanism such as slickline, downhole tractors, or wireline. The conveyance mechanism 212 may also be a pipe conveyance mechanism such as drill pipe or a cable-pipe conveyance mechanism such as coiled tubing. Additionally, a measurement tool 206 can be coupled to the conveyance mechanism 212 for positioning the measurement tool 206 downhole in the wellbore 204 and within the tubular 202.

A vibration-inducing device (not depicted) can cause vibration in the tubular 202. For example, the vibration-inducing device can be a Lorentz force device. In an example, the Lorentz force device can include one or more permanent magnets and one or more current carrying coils to generate electromagnetic pulses that can cause the tubular 202 to vibrate. A mechanical jar or mechanical hammer can generate mechanical pulses that can cause the tubular 202 to vibrate. Additionally, a roller device with an irregular pattern can move along a length of the tubular 202 and the irregular pattern contacting the tubular 202 can cause the tubular 202 to vibrate.

Additionally, an interferometer 208 can be coupled with the measurement tool 206. In some examples, the measurement tool 206 may rotate to position the interferometer 208. The interferometer 208 can be a device for measuring the interference pattern between two or more sources of light. In some examples, the interferometer 208 can be a laser interferometer such as a Michelson laser interferometer, a laser vibrometer, etc., or the interferometer 208 can be another suitable device for detecting vibration. Laser distancing devices, such as a laser distance meter, may also be coupled with the measurement tool 206 for detecting a distance between the measurement tool 206 and the tubular 202.

In some examples, the vibration-inducing device can cause vibration in the tubular 202 and the interferometer 208 can detect the vibration. For example, the Lorentz force device can cause vibration of the tubular 202 and the interferometer 208 can detect the vibration. The interferometer 208 can be a laser vibrometer. The laser vibrometer may be a two-beam laser interferometer that can use the Doppler effect to measure vibration. The Doppler effect can be a change in frequency due to reflection of a wave off of a moving object (e.g., the vibrating tubular 202). The laser vibrometer can analyze an interference pattern between a laser beam directed to the tubular 202 and a reference laser beam not directed to the tubular 202. The laser vibrometer can, via analysis of the interference pattern, determine a doppler shift of the laser beam reflecting off the tubular 202 during vibration. An amplitude and frequency of the laser beam can be extracted from the Doppler shift and can be used to determine a status of the tubular 202, a status of the cement layer 210, or a combination thereof. The status of the tubular 202 may be associated with detecting damage to the tubular 202. The status of the cement layer 210 may be associated with detecting damage to the cement layer 210 or detecting an area of the cement layer 210 not sufficiently sealing the annulus between the wellbore 204 and the tubular 202.

For example, the amplitude of a vibrational wave, a light wave, or other suitable wave detected by the interferometer 208 can be a magnitude of the vibration experienced by the tubular 202. The amplitude of an energy wave reflected off the tubular 202 may be indicative of the stress experienced by the tubular 202 due to the vibration. A higher amplitude can be associated with higher stress, which can suggest that the tubular 202 has undergone damage, the tubular 202 may be prone to damage, or a combination thereof. Additionally, the frequency of the vibration of the tubular 202 can be used to determine a thickness of the tubular 202. Thus, the frequency of vibration of the tubular 202 can also be indicative of damage to the tubular 202. For example, a segment of the tubular 202 with a high frequency of vibration may be thinner than a segment of the tubular 202 with a lower frequency of vibration. Additionally, damping of the energy wave detected by the interferometer 208 can be a measure of a reduction of the amplitude of the energy wave. The damping of the energy wave can be used to determine an impedance of the cement layer 210. In an example, a high impedance can indicate a strong bond between the tubular 202 and the cement layer 210.

Figure 3:
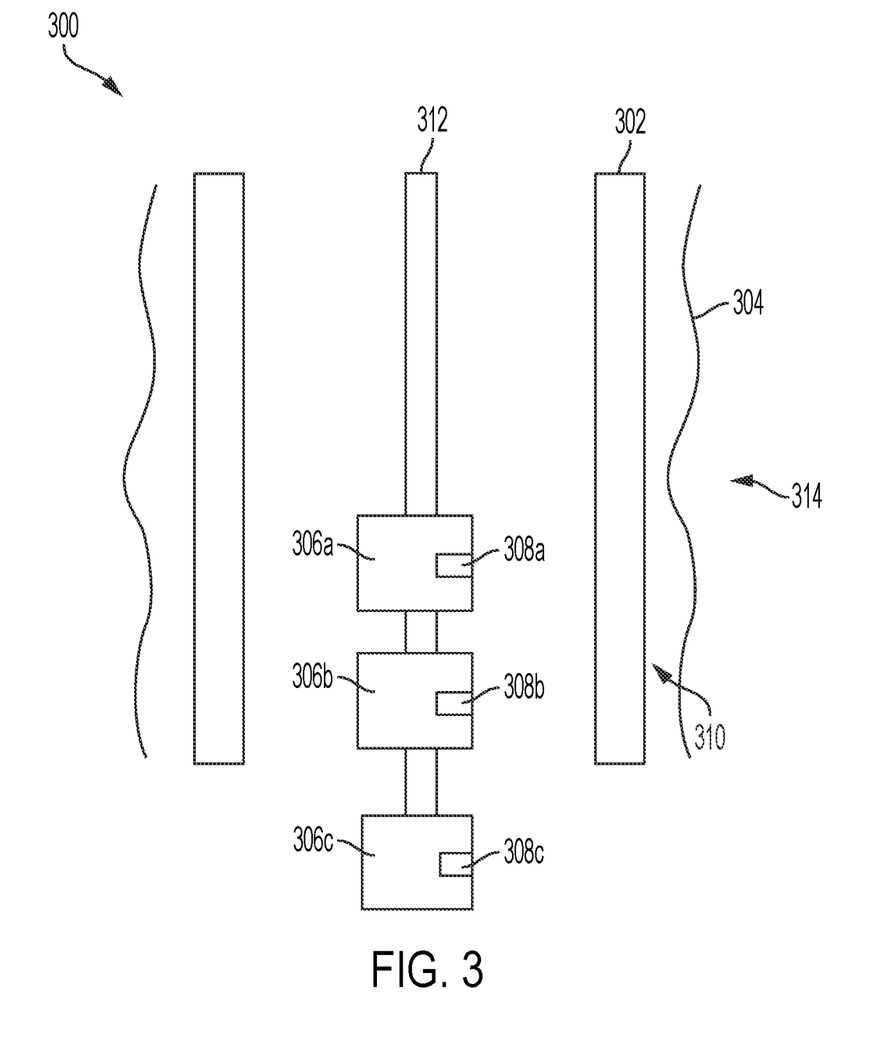
FIG. 3 is a schematic of a system for tubular evaluation using vibration according to one example of the present disclosure.

FIG. 3 is a schematic of a system 300 for tubular 302 evaluation using vibration according to one example of the present disclosure. The tubular 302 can be positioned in a wellbore 304. A cement layer 310 can be positioned in an annulus between the tubular 302 and a subterranean formation 314 surrounding the wellbore 304. The system can include a conveyance mechanism 312 coupled to measurement tools 306a-c. The conveyance mechanism 312 can position the measurement tools 306a-c within the tubular 302. Additionally, interferometers 308a-c can be coupled to the measurement tools 306a-c. The interferometers 308a-c can be positioned, via the coupling with the measurement tools 306a-c, a distance apart to facilitate measurements of vibration at multiple locations along a length of the tubular 302.

In some examples, one or more vibration-inducing devices can cause vibration at one or more locations along the length of the tubular 302 and the interferometers 308a-c can detect the vibration at the one or more locations. The positioning of the interferometers 308a-c can enable evaluation of the tubular 302 and the cement layer 310 at multiple depths. The system 300 can detect vibration via a pulse-echo configuration or the system 300 can detect vibration via a pitch-catch configuration. In the pulse-echo configuration the vibration can be detected at a location an electromagnetic pulse, acoustic pulse, mechanical pulse, or other suitable energy pulse caused the vibration. In the pitch-catch configuration the vibration can be caused by the energy pulse at first location and the vibration can be detected at a second location as the vibration propagates along the length of the tubular 302. Additionally, in an example, a vibration-inducing device can cause vibration at a location on the tubular 302 and the interferometers 308a-c can detect, at multiple locations, a propagation of the vibration along the length of the tubular 302. The interferometers 308a-c may simultaneously detect the vibration at the multiple locations or the interferometers 308a-c may stagger detection by a certain amount of time.

Figure 4:
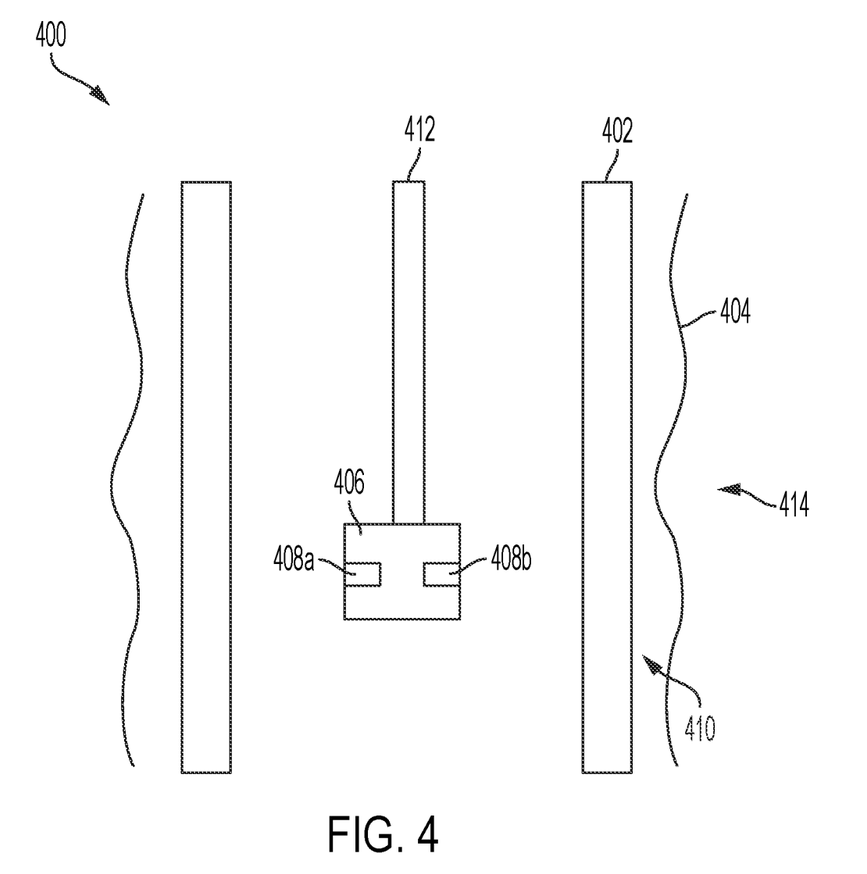
FIG. 4 is a schematic of a system for tubular evaluation using vibration according to one example of the present disclosure.

FIG. 4 is a schematic of a system 400 for tubular 402 evaluation using vibration according to one example of the present disclosure. The tubular 402 can be positioned in a wellbore 404. A cement layer 410 can be formed in an annulus between the tubular 402 and a subterranean formation 414 surrounding the wellbore 404. The system 400 can include a conveyance mechanism 412 coupled to a measurement tool 406. The conveyance mechanism 412 can position the measurement tool 406 within the tubular 402. Interferometers 408a-b can be coupled to the measurement tool 406 and can be positioned along an edge of the measurement tool 406 a distance apart.

In some examples, the interferometers 408a-b can facilitate measurements of vibration at multiple locations along an azimuth of the tubular 402. In an example, each of the interferometers 408a-b can be associated with an energy pulse to provide multiple pulse-echo configurations along the azimuth of the tubular 402. The detection of vibration of the tubular 402 by the interferometers 408a-b can be used to determine frequency values, amplitude values, or other suitable measurements for a segment of the tubular. The frequency values, amplitude values, or other suitable measurements can be averaged or otherwise used in combination to determine a status of the segment of the tubular 402, a status of a segment of the cement layer 410 associated with the segment of the tubular, or a combination thereof. Additionally, by detecting vibration at multiple locations along the azimuth of the tubular 402, the frequency values, the amplitude values, and the other suitable measurements can be independent of eccentricity. Thus, the measurement tool 406 can be positioned in a location non-central relative to the tubular 402 and accurate data can be generated to evaluate the tubular 402. The use of the interferometers 408a-b can further enable evaluation of the tubular 402 without requiring rotation or repositioning of the measurement tool 406.

Additionally, or alternatively, the system 400 can include laser distancing devices such as laser distancing meters. The laser distancing devices can be used to measure one or more radial distances from the interferometers 408a-b to the tubular 402. The laser distancing devices can, via the one or more radial distances, guide positioning of an interferometer 408a within a section of the measurement tool 406 or positioning of the measurement tool 406 within the tubular 402. In some examples, frequency, amplitude, or other suitable measurements can be dependent on eccentricity. Thus, the one or more radial distances can be used to position the measurement tool 406 in a center of the tubular 402. Additionally, in some examples, an echo of an energy wave detect by the interferometers 408a-b can be independent of eccentricity when detected as a particular location. Thus, the laser distancing devices can be used to position the interferometers 408a-b to detect the echo at the particular location.

Figure 5:
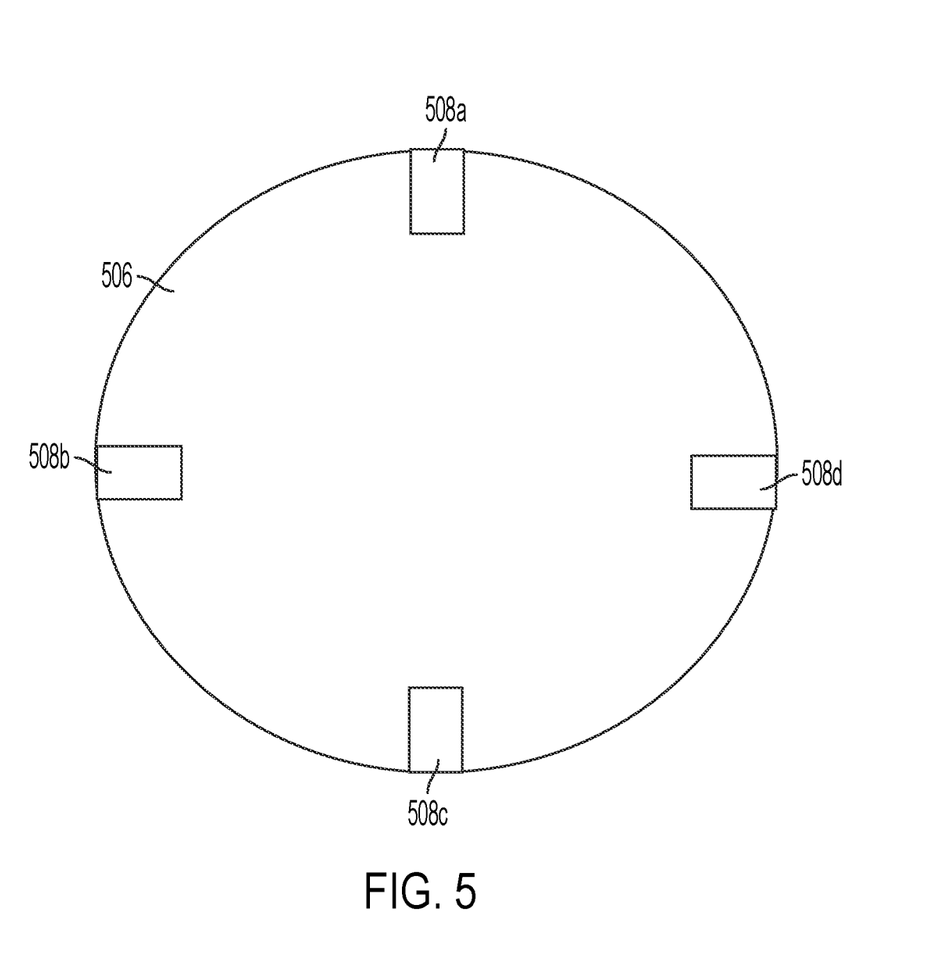
FIG. 5 is a top view of a measurement tool that can be used in tubular evaluation according to one example of the present disclosure.

FIG. 5 is a top view of a measurement tool 506 that can be used in tubular evaluation according to one example of the present disclosure. In some examples, interferometers 508a-d can facilitate measurements of vibration at multiple locations along an azimuth of a tubular. In an example, each of the interferometers 508a-d can be associated with an energy pulse to provide multiple pulse-echo configurations along the azimuth of the tubular. Additionally, the use of the interferometers 508a-d can enable evaluation of the tubular without requiring rotation or repositioning of the measurement tool 506.

Additionally, or alternatively, the measurement tool 506 can be coupled to additional devices associated with multiple laser measurement techniques. For example, the additional devices may include laser distancing meters, laser vibrometers, LiDAR systems, or other suitable laser measurement devices or techniques. The interferometers 508a-d, the additional devices, or a combination thereof can be used to generate data that can be used to determine parameters associated with the tubular. For example, vibrational frequency data can be used to determine a thickness of the tubular. Additionally, amplitude data can be used to determine a damping of the vibrational wave. The damping of the vibrational wave can be used to determine the impedance of the cement layer. The parameters can further be used to determine a status of the cement layer, a status of the tubular, or a combination thereof.

Figure 6:
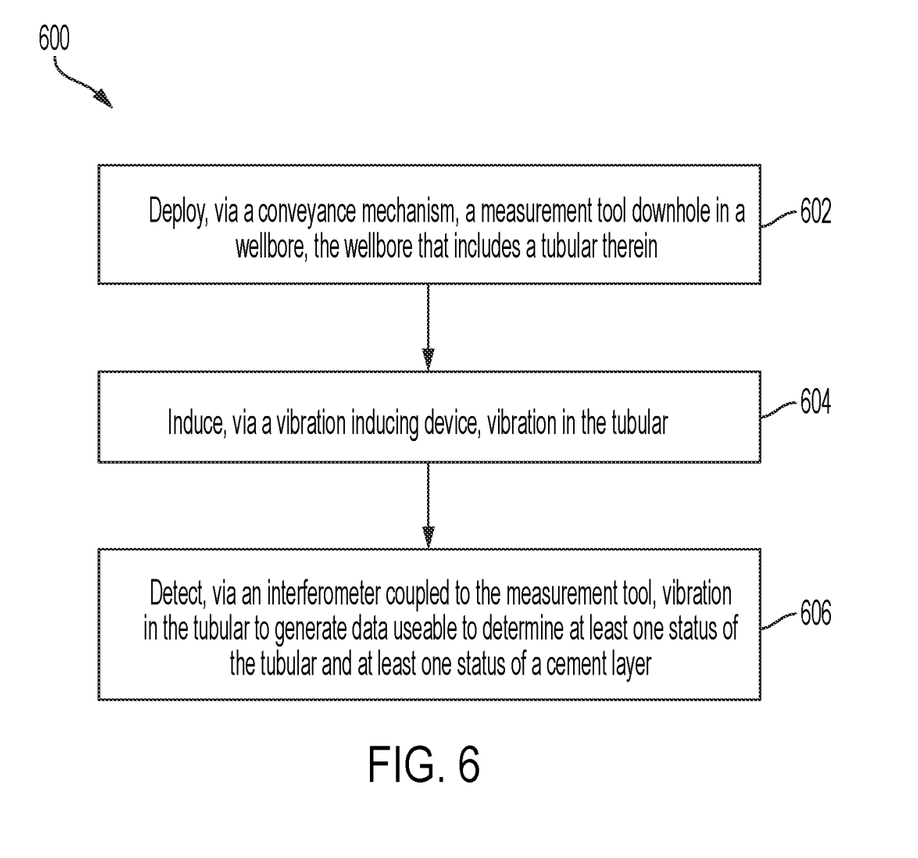
FIG. 6 is a flowchart of a process for evaluating a tubular using vibration according to one example of the present disclosure.

FIG. 6 is a flowchart of a process 600 for evaluating a tubular 202 using vibration according to one example of the present disclosure. Aspects of FIG. 6 are discussed in reference to FIG. 2. The tubular 202 can experience deformation, corrosion, or other suitable damage while positioned in a wellbore 204. Additionally, a cement layer 210 can be positioned adjacent to the tubular 202 to seal an annulus between the tubular 202 and the wellbore 204. The cement layer 210 may also experience damage over time or a bond between the cement layer 210 and the tubular 202 may degrade over time. Thus, the tubular 202 can be evaluated to determine a status of the tubular 202 or a status of the cement layer 210. For example, a status of the tubular can indicate damage to the tubular 202. Additionally, the status of the cement layer 210 can indicate a lack of contact between the tubular 202 and the cement layer 210.

At block 602, the system 200 can deploy, via a conveyance mechanism 212, a measurement tool 206 downhole in the wellbore 204 that includes the tubular 202 therein. The conveyance mechanism 212 may position the measurement tool 206 at a depth in the tubular 202 to obtain data associated with a particular portion of the tubular 202. The tubular 202 may include a downhole tubular that can be positioned in a wellbore 204, a surface tubular that can be positioned at the surface of a well system, or a combination thereof. The downhole tubular can include a casing string, a tubing string, or the like, and the surface tubular can include a surface pipeline, etc. The tubular 202 can be used with respect to one or more wellbore operations. The conveyance mechanism 212 can be any suitable apparatus for deploying the measurement tool 206 such as wireline, slickline, or drill pipe. The measurement tool 206 can be a rotating or stationary head coupled to a portion of the conveyance mechanism 212.

At block 604, the system 200 can induce, via the vibration-inducing device, vibration in the tubular 202. In an example, the system 200 can position the vibration-inducing device to cause the tubular 202 to vibrate at a location along the length of the tubular 202. The vibration-inducing device can be positioned using the conveyance mechanism 212, the measurement tool 206, or other suitable components associated with the wellbore 204 or tubular 202. The vibration-inducing device can be a Lorentz force device or other suitable device that can generate electromagnetic pulses to cause the vibration in the tubular 202. The vibration-inducing device can also be a mechanical hammer, a mechanical jar, a roller device, or other suitable device that can generate mechanical pulses to cause the vibration in the tubular 202. Additionally, a speaker or other suitable device can generate acoustic pulses to cause the vibration in the tubular 202.

At block 606, the system 200 can detect, via an interferometer 208 coupled to the measurement tool 206, the vibration in the tubular 202 to generate data that is useable to determine at least one status of the tubular 202 and at least one status of the cement layer 210. The conveyance mechanism 212 and the measurement tool 206 can position the interferometer 208 to detect the vibration in the tubular 202 at a particular location. The interferometer 208 can be positioned by rotation of the measurement tool 206. In some examples, the measurement tool 206 can include sections and the interferometer 208 can be positioned within the sections. Additionally, in some examples, the interferometer 208 can be a laser interferometer such as a Michelson laser interferometer, a laser vibrometer, or the like. The laser interferometer can be optically directed using, for example, beam splitters, turning optics, or other suitable devices, to detect the vibration in the tubular 202 at the particular location.

In an example, the laser interferometer can analyze an interference pattern between a laser beam reflecting off the tubular 202 during vibration and a reference laser beam that does not interact with the tubular 202. The data, such as frequency data, amplitude data, and other suitable data can be obtained from analysis of the interference pattern. The data can be used to determine parameters associated with the tubular 202 or the cement layer 210, determine a status of the tubular 202, determine a status of the cement layer 210, or a combination thereof. For example, the frequency data can be used to determine a thickness of the tubular 202. The thickness can be used to determine the status of the tubular 202 including, for example, whether the tubular 202 has experienced corrosion. Additionally, the amplitude data can be used to determine an impedance of the cement layer 210. The impedance of the cement layer 210 can be used to determine the status of the cement layer 210 including, for example, whether the cement layer 210 is securely bonded to the tubular 202.

Additionally or alternatively, the system 200 can include a computing device. The system 200 may, via the computing device, receive data associated with the vibration of the tubular 202 as detected by the interferometer 208. The computing device may, determine, based on the data, the parameters associated with the tubular 202. For example, the system 200 can detect, by the interferometer 208, at least one vibrational wave and determine a damping of the at least one vibrational wave. The damping of the at least one vibrational wave can be a measure of oscillatory decay of the at least one vibration wave. The oscillatory decay of the at least one vibrational wave can be due to interaction with the tubular 202, propagation through a medium, other suitable factors affecting the at least vibrational wave, or a combination thereof. Additionally, an impedance of a segment of the cement layer 210 can be determined based on the damping of the at least one vibrational wave. The impedance of the segment of the cement layer 210 can be a measure of resistance to the vibration imposed on the tubular 202. For example, a tubular 202 with a strong bond to the cement layer 210 may resist vibration and cause significant oscillatory decay of the at least one vibrational wave. The system 200 can also determine a frequency of the vibration in the tubular. The frequency can be a number of vibrations that occur in a given amount of time, and can be indicative of a thickness of the tubular 202.

Additionally, the system 200 may, via the computing device, determine, based on the parameters, at least one status of the tubular 202 and at least one status of the cement layer 210. For example, a parameter can be a high impedance due to the cement layer 210 increasing tubular resistance to vibration. Thus, as an example, the status of the cement layer 210 can indicate a strong bond between the segment of the cement layer 210 and the tubular 202. Additionally, a first frequency associated with a first segment of the tubular 202 can be lower than a second frequency associated with a second segment of the tubular 202. This may indicate the first segment of the tubular 202 has a greater thickness than the second segment of the tubular 202. Thus, a status of the second segment of the tubular 202 can indicate corrosion or damage to the second segment of the tubular 202.

In some examples, the system 200 may execute an adjustment to a position of the interferometer 208 based on a target location for detecting the vibration of the tubular 202. For example, the target location can be a location for which measurements obtained can be independent of eccentricity. Additionally, the system 200 may execute an adjustment to a position of the measurement tool 206 based on the target location, at least one distance between the measurement tool 206 and the tubular 202, or a combination thereof. The adjustments to the interferometer and the measurement tool can facilitate accurate and comprehensive evaluation of the tubular 202 and the cement layer 210.

Additionally or alternatively, the system 200 can position a plurality of interferometers a distance apart relative to the length of the tubular 202 and position the plurality of interferometers axially relative to the tubular 202 (e.g., as depicted in FIG. 3). The system 200 may detect, via the plurality of interferometers, vibrations as more than one location along the length of the tubular 202. The system 200 may also position a second plurality of interferometers a distance apart along an edge of the measurement tool 206 and position the second plurality of interferometers azimuthally relative to the tubular 202 (e.g., as depicted in FIG. 4). The system 200 may detect vibration at multiple locations along an azimuth of the tubular 202 via the second plurality of interferometers. Additionally, the system 200 may determine, via the second plurality of interferometers, at least one radial distance between the second plurality of interferometers and the tubular 202. In some examples, laser distancing meters, lidar, or other suitable laser measuring techniques can also be integrated in the measurement tool 206.

In a particular example, the tubular 202 can include multiple measurement tools positioned a distance apart (e.g., as depicted in FIG. 3.). Additionally, the multiple measurement tools can have multiple interferometers (e.g., as depicted in FIG. 4 and FIG. 5). Thus, vibration can be detected at multiple depths of the tubular 202 and along multiple azimuths associated with the multiple depths to generate comprehensive data for evaluating the tubular 202.

Figure 7:
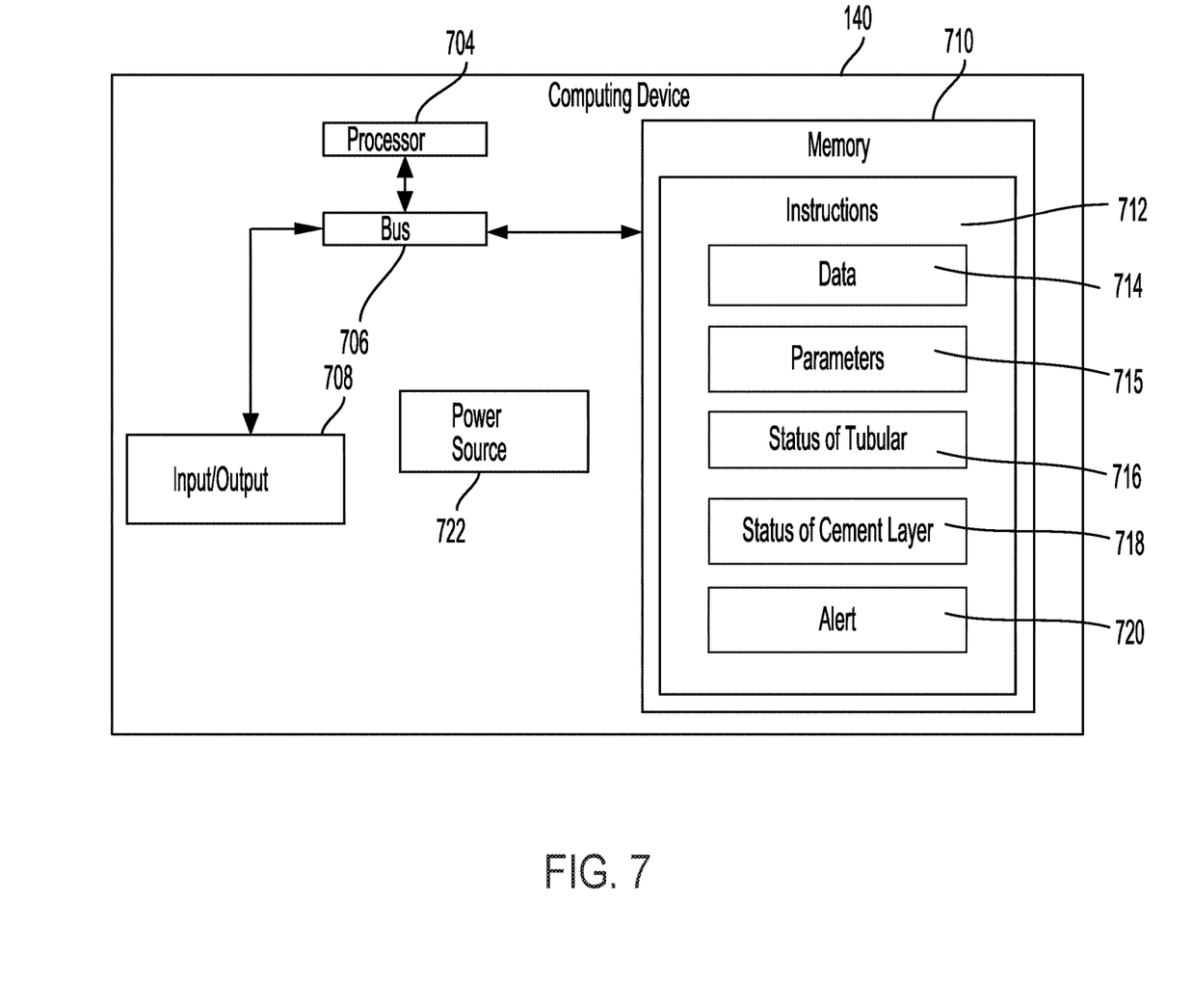
FIG. 7 is a block diagram of a computing device for evaluating a tubular using vibration according to one example of the present disclosure.

FIG. 7 is a block diagram of a computing device 140 for evaluating a tubular using vibration according to one example of the present disclosure. The components shown in FIG. 7, such as a processor 704, a memory 710, a power source 722, an input/output 708, and the like may be integrated into a single structure such as within a single housing of a computing device 140. Alternatively, the components shown in FIG. 7 can be distributed from one another and in electrical communication with each other.

The computing device 140 can include the processor 704, the memory 710, and a bus 706. The processor 704 can execute one or more operations for evaluating the tubular positioned in a wellbore using data 714 associated with vibration of the tubular. The processor 704 can execute instructions 712 stored in the memory 710 to perform the operations. The processor 704 can include one processing device or multiple processing devices or cores. Non-limiting examples of the processor 704 include a Field-Programmable Gate Array ("FPGA"), an application-specific integrated circuit ("ASIC"), a microprocessor, etc.

The processor 704 can be communicatively coupled to the memory 710 via the bus 706. The non-volatile memory may include any type of memory device that retains stored information when powered off. Non-limiting examples of the memory 710 may include EEPROM, flash memory, or any other type of non-volatile memory. In some examples, at least part of the memory 710 can include a medium from which the processor 704 can read instructions 712. A computer-readable medium can include electronic, optical, magnetic, or other storage devices capable of providing the processor 704 with computer-readable instructions or other program code. Nonlimiting examples of a computer-readable medium include (but are not limited to) magnetic disk(s), memory chip(s), ROM, RAM, an ASIC, a configured processor, optical storage, or any other medium from which a computer processor can read instructions 712. The instructions 712 can include processor-specific instructions generated by a compiler or an interpreter from code written in any suitable computer-programming language, including, for example, C, C++, C#, Perl, Java, Python, etc.

In some examples, the memory 710 can be a non-transitory computer readable medium and can include computer program instructions 712. For example, the computer program instructions 712 can be executed by the processor 704 for causing the processor 704 to perform various operations. For example, the processor 704 can receive data 714 associated vibration of a tubular. The vibration can be caused by a vibration-inducing device and the vibration can be detected by an interferometer coupled to a measurement tool. The processor 704 can further determine, based on the data 714, parameters 715 associated with the tubular and a cement layer. The cement layer can be positioned between the tubular and a subterranean formation surrounding the wellbore. Additionally, the processor 704 can determine, based on the parameters 715, at least one status of the tubular 716 and at least one status of a cement layer 718.

In some examples, the processor 704 may receive the data 714 from a plurality of interferometers. Thus, the data 714 can be associated with vibration at more than one location along the length of the tubular. Additionally, the processor 704 may receive data 714 from a second plurality of interferometers. The data 714 can be associated with at least one radial distance between a second plurality of interferometers and the tubular.

In some examples, the parameters 715 determined by the processor 704 can include a damping of at least one vibrational wave associated with vibration of the tubular, a frequency of the vibration of the tubular, or other suitable parameters. Additionally, the processor 704 can determine, based on the damping of the at least one vibrational wave, an impedance of a segment of the cement layer. The impedance can indicate a resistance to vibration of the segment of the cement layer, a segment of the tubular associated with the segment of the cement layer, or a combination thereof. The impedance can be used to determine the status of the cement layer 718, such as the status of the bond between the segment of the cement layer and the segment of the tubular. Additionally, in an example, the processor 704 can determine a first impedance of a first segment of the cement layer and can determine a second impedance of a second segment of the cement layer. The processor 704 may generate, based on the second impedance being less than the first impedance, an alert 720 for a user, the alert 720 associated with the status of the cement layer 718 and the alert providing an indication of a disruption to a bonding of the cement layer and the tubular.

The processor 704 may further determine, based the frequency of the vibration of the tubular, a thickness of a segment of the tubular. The thickness of the segment of the tubular can be used to determine a status of the tubular 716. For example, the status of the tubular 716 can be associated with damage to the tubular since, for example, a damaged segment of the tubular may be less thick than a nondamaged segment of the tubular. In an example, the processor 704 may determine a first thickness of a first segment of the tubular and determine a second thickness of a second segment of the tubular. The processor may generate, based on the second thickness being less than the first thickness, the alert 720 for a user, the alert 720 associated with the status of the tubular 716 and the alert 720 providing an indication of damage to the tubular. In some examples, additional alerts, statuses, or a combination thereof can be generated by the processor 704.

The computing device 140 can additionally include the input/output 708. The input/output 708 can connect to a keyboard, a pointing device, a display, other computer input/output devices or any combination thereof. An operator or other suitable user may provide input using the input/output 708. Data relating to the wellbore, the tubular, the cement layer, or a combination thereof can be displayed to an operator or other suitable user related to a wellbore operation through a display that is connected to or is part of the input/output 708. The displayed values can be observed by the operator, a supervisor, or other suitable user related to a wellbore operation, who can adjust the wellbore operation based on the displayed values. The displayed value can be an alert associated with the status of the tubular 716, the status of the cement layer 718, or a combination thereof. Alternatively, the computing device 140 can, instead of displaying the values, automatically control or adjust the measurement tool, the interferometer, the tubular, or other component associated with the wellbore operation based on the displayed values. For example, the processor 704 may execute an adjustment to a position of the interferometer based on a target location for detecting vibration in the tubular. Additionally, the processor 704 may also execute an adjustment to a position of the measurement tool based on at least one distance between the measurement tool and the tubular.

In some aspects, systems and methods for downhole status detection using vibration are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a measurement tool coupled to a conveyance mechanism for positioning the measurement tool downhole in a wellbore, the wellbore including a tubular; a vibration-inducing device for causing the tubular to vibrate; and an interferometer coupled to the measurement tool for detecting the vibration in the tubular to generate data that is usable to determine at least one status of the tubular or at least one status of a cement layer, the cement layer positioned between the tubular and a subterranean formation surrounding the wellbore.

Example 2 is the system of example(s) 1, further comprising a plurality of interferometers, wherein the plurality of interferometers are positioned a distance apart relative to a length of the tubular and positioned axially relative to the tubular to detect the vibration in the tubular at more than one location along the length of the tubular.

Example 3 is the system of example(s) 1-2, further comprising a second plurality of interferometers, wherein the second plurality of interferometers are positioned a distance apart along an edge of the measurement tool and positioned azimuthally relative to the tubular to determine at least one radial distance between the second plurality of interferometers and the tubular.

Example 4 is the system of example(s) 1-3, wherein the vibration-inducing device is positionable to cause the vibration in the tubular at a location along a length of the tubular and the interferometer is positionable to detect the vibration in the tubular at the location along the length of the tubular.

Example 5 is the system of example(s) 1-4, further comprising: a processing device; and a memory device that includes instructions executable by the processing device for causing the processing device to perform operations comprising: receiving, by the processing device, data associated with the vibration in the tubular detected by the interferometer; determining, based on the data, parameters associated with the tubular and the cement layer; and determining, based on the parameters, the at least one status of the tubular and the at least one status of the cement layer.

Example 6 is the system of example(s) 1-5, wherein the operation of determining, based on the data, parameters associated with the tubular and the cement layer further comprises: determining a damping of at least one vibrational wave associated with the vibration in the tubular; determining a frequency of the vibration in the tubular; determining, based on the damping of the at least one vibrational wave, an impedance of a segment of the cement layer, the impedance associated with a bonding of the cement layer to the tubular; and determining, based the frequency, a thickness of a segment of the tubular.

Example 7 is the system of example(s) 1-6, further comprising the operations of: executing, by the processing device, an adjustment to a position of the interferometer based on a target location for detecting the vibration in the tubular; and executing, by the processing device, an adjustment to a position of the measurement tool based on at least one distance between the measurement tool and the tubular.

Example 8 is a method comprising: deploying, via a conveyance mechanism, a measurement tool downhole in a wellbore that includes a tubular therein; inducing, via a vibration-inducing device, vibration in the tubular; and detecting, via an interferometer coupled to the measurement tool, the vibration in the tubular to generate data that is useable to determine at least one status of the tubular or at least one status of a cement layer, the cement layer positioned between the tubular and a subterranean formation surrounding the wellbore.

Example 9 is the method of example(s) 8, further comprising: positioning a plurality of interferometers a distance apart relative a length of the tubular and positioning the plurality of interferometers axially relative to the tubular; and detecting, via the plurality of interferometers, the vibration in the tubular at more than one location along the length of the tubular.

Example 10 is the method of example(s) 8-9, further comprising: positioning a second plurality of interferometers a distance apart along an edge of the measurement tool and positioning the second plurality of interferometers azimuthally relative to the tubular; and determining, via the second plurality of interferometers, at least one radial distance between the second plurality of interferometers and the tubular.

Example 11 is the method of example(s) 8-10, further comprising: positioning the vibration-inducing device to cause the vibration in the tubular at a location along a length of the tubular; and detecting, via the interferometer, the vibration in the tubular at the location along the length of the tubular.

Example 12 is the method of example(s) 8-11, further comprising: receiving data associated with the vibration in the tubular; determining, based on the data, parameters associated with the tubular and the cement layer; and determining, based on the parameters, the at least one status of the tubular and the at least one status of the cement layer.

Example 13 is the method of example(s) 8-12, wherein determining, based on the data, parameters associated with the tubular and the cement layer further comprises: determining a damping of at least one vibrational wave associated with the vibration in the tubular; determining a frequency of the vibration in the tubular; determining, based on the damping of the at least one vibrational wave, an impedance of a segment of the cement layer, the impedance associated with a bonding of the cement layer to the tubular; and determining, based the frequency, a thickness of a segment of the tubular.

Example 14 is the method of example(s) 8-13, further comprising: executing an adjustment to a position of the interferometer based on a target location for detecting the vibration in the tubular; and executing an adjustment to a position of the measurement tool based on at least one distance between the measurement tool and the tubular.

Example 15 is a system comprising: a processing device; and a memory device that includes instructions executable by the processing device for causing the processing device to perform operations comprising: receiving, by the processing device, data associated with vibration in a tubular positioned in a wellbore, the vibration in the tubular detected by an interferometer coupled to a measurement tool, the vibration in the tubular caused by a vibration-inducing device; determining, based on the data, parameters associated with the tubular and a cement layer, the cement layer positioned between the tubular and a subterranean formation surrounding the wellbore; and determining, based on the parameters, at least one status of the tubular or at least one status of a cement layer.

Example 16 is the system of example(s) 15, wherein determining, based on the data, the parameters associated with the tubular and the cement layer further comprises: determining a damping of at least one vibrational wave associated with vibration in the tubular; determining a frequency of the vibration in the tubular; determining, based on the damping of the at least one vibrational wave, an impedance of a segment of the cement layer; and determining, based on the frequency, a thickness of a segment of the tubular.

Example 17 is the system of example(s) 15-16, further comprising: executing, by the processing device, an adjustment to a position of the interferometer based on a target location for detecting the vibration in the tubular; and executing, by the processing device, an adjustment to a position of the measurement tool based on at least one distance between the measurement tool and the tubular.

Example 18 is the system of example(s) 15-17, further comprising: determining a first thickness of a first segment of the tubular; determining a second thickness of a second segment of the tubular; and generating, based on the second thickness being less than the first thickness, an alert for a user, the alert providing an indication of damage to the tubular.

Example 19 is the system of example(s) 15-18, further comprising: determining a first impedance of a first segment of the cement layer; determining a second impedance of a second segment of the cement layer; and generating, based on the second impedance being less than the first impedance, an alert for a user, the alert providing an indication of a disruption to a bonding of the cement layer and the tubular.

Example 20 is the system of example(s) 15-19, wherein receiving, by the processing device, data associated with the vibration in the tubular further comprises: receiving data associated with vibration in the tubular to more than one location along a length of the tubular, the vibration in the tubular detected by a plurality of interferometers positioned a distance apart relative to a length of the tubular and positioned axially relative to the tubular; and receiving data associated with at least one radial distance between a second plurality of interferometers and the tubular, the at least one radial distance detected by the second plurality of interferometers positioned a distance apart along an edge of the measurement tool and positioned azimuthally relative to the tubular.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a measurement tool coupled to a conveyance mechanism for positioning the measurement tool downhole in a wellbore, the wellbore including a tubular;
a vibration-inducing device for causing the tubular to vibrate; and
at least one interferometer coupled to the measurement tool for detecting the vibration at a first location along an azimuth of the tubular to generate first data and for detecting the vibration at a second location along the azimuth of the tubular to generate second data, wherein a first depth of the first location along the azimuth of the tubular is substantially equal to a second depth of the second location along the azimuth of the tubular, and wherein the first data and the second data are used to determine a status of the tubular or a status of a cement layer, the cement layer positioned between the tubular and a subterranean formation surrounding the wellbore, the status of the tubular being indicative of whether there is damage to the tubular, or the status of the cement layer being indicative of whether there is a strong bond between the cement layer and the tubular.

2. The system of claim 1, further comprising a second interferometer, wherein the second interferometer is positionable a distance apart relative to a length of the tubular from the at least one interferometer and positionable axially relative to the tubular from the at least one interferometer to detect the vibration in the tubular at a third location along the length of the tubular.

3. The system of claim 1, wherein the at least one interferometer is usable to determine at least one radial distance between the at least one interferometer and the tubular.

4. The system of claim 1, wherein the vibration-inducing device is positionable to cause the vibration in the tubular at a third location along a length of the tubular and the at least one interferometer is positionable to detect the vibration in the tubular at the first location and the second location.

5. The system of claim 1, further comprising:
a processing device; and
a memory device that includes instructions executable by the processing device for causing the processing device to perform operations comprising:
receiving, by the processing device, the first and the second data associated with the vibration in the tubular detected by the at least one interferometer;
determining, based on the first data and the second data, parameters associated with the tubular and the cement layer; and
determining, based on the parameters, the status of the tubular and the status of the cement layer.

6. The system of claim 5, wherein the operation of determining, based on the first data and the second data, the parameters associated with the tubular and the cement layer further comprises:
determining a damping of at least one vibrational wave associated with the vibration in the tubular;
determining a frequency of the vibration in the tubular;
determining, based on the damping of the at least one vibrational wave, an impedance of a segment of the cement layer, the impedance associated with a bonding of the cement layer to the tubular; and
determining, based the frequency, a thickness of a segment of the tubular.

7. The system of claim 5, further comprising the operations of:
executing, by the processing device, an adjustment to a position of the at least one interferometer based on a target location for detecting the vibration in the tubular; and
executing, by the processing device, an adjustment to a position of the measurement tool based on at least one distance between the measurement tool and the tubular.

8. A method comprising:
deploying, via a conveyance mechanism, a measurement tool downhole in a wellbore that includes a tubular therein;
inducing, via a vibration-inducing device, vibration in the tubular; and
detecting, via at least one interferometer coupled to the measurement tool, the vibration at a first location along an azimuth of the tubular to generate first data and detecting the vibration at a second location along the azimuth of the tubular to generate second data, wherein a first depth of the first location along the azimuth of the tubular is substantially equal to a second depth of the second location along the azimuth of the tubular, and wherein the first data and the second data are used to determine a status of the tubular or of a cement layer, the cement layer positioned between the tubular and a subterranean formation surrounding the wellbore, the status of the tubular being indicative of whether there is damage to the tubular, or the status of the cement layer being indicative of whether there is a strong bond between the cement layer and the tubular.

9. The method of claim 8, further comprising:
positioning a second interferometer a distance apart relative a length of the tubular from the at least one interferometer and positioning the second interferometer axially relative to the tubular from the at least one interferometer; and
detecting, via the second interferometer, the vibration in the tubular at a third location along the length of the tubular.

10. The method of claim 8, further comprising:
determining, via the at least one interferometer, at least one radial distance between the at least one interferometer and the tubular.

11. The method of claim 8, further comprising:
positioning the vibration-inducing device to cause the vibration in the tubular at a third location along a length of the tubular; and
detecting, via the at least one interferometer, the vibration in the tubular at the first location and the second location.

12. The method of claim 8, further comprising:
receiving the first data and the second data associated with the vibration in the tubular;
determining, based on the first data and the second data, parameters associated with the tubular and the cement layer; and
determining, based on the parameters, the status of the tubular and the status of the cement layer.

13. The method of claim 12, wherein determining, based on the first data and the second data, parameters associated with the tubular and the cement layer further comprises:
determining a damping of at least one vibrational wave associated with the vibration in the tubular;
determining a frequency of the vibration in the tubular;
determining, based on the damping of the at least one vibrational wave, an impedance of a segment of the cement layer, the impedance associated with a bonding of the cement layer to the tubular; and determining, based on the frequency, a thickness of a segment of the tubular.

14. The method of claim 12, further comprising:
executing an adjustment to a position of the at least one interferometer based on a target location for detecting the vibration in the tubular; and
executing an adjustment to a position of the measurement tool based on at least one distance between the measurement tool and the tubular.

15. A system comprising:
a processing device; and
a memory device that includes instructions executed by the processing device for causing the processing device to perform operations comprising:
receiving, by the processing device, first data associated with vibration at a first location along an azimuth of a tubular positioned in a wellbore, the vibration at the first location along the azimuth of the tubular detected by at least one interferometer coupled to a measurement tool, and the vibration in the tubular caused by a vibration-inducing device;
receiving, by the processing second, second data associated with vibration at a second location along the azimuth of the tubular, the vibration at the second location along the azimuth of the tubular detected by the at least one interferometer coupled to the measurement tool, wherein a first depth of the first location along the azimuth of the tubular is substantially equal to a second depth of the second location along the azimuth of the tubular;
determining, based on the first data and the second data, parameters associated with the tubular and a cement layer, the cement layer positioned between the tubular and a subterranean formation surrounding the wellbore; and
determining, based on the parameters, a status of the tubular or a status of a cement layer, the status of the tubular being indicative of whether there is damage to the tubular, or the status of the cement layer being indicative of whether there is a strong bond between the cement layer and the tubular.

16. The system of claim 15, wherein determining, based on the first data and the second data, the parameters associated with the tubular and the cement layer further comprises:
determining a damping of at least one vibrational wave associated with vibration in the tubular;
determining a frequency of the vibration in the tubular;
determining, based on the damping of the at least one vibrational wave, an impedance of a segment of the cement layer; and
determining, based on the frequency, a thickness of a segment of the tubular.

17. The system of claim 15, further comprising:
executing, by the processing device, an adjustment to a position of the at least one interferometer based on a target location for detecting the vibration in the tubular; and
executing, by the processing device, an adjustment to a position of the measurement tool based on at least one distance between the measurement tool and the tubular.

18. The system of claim 15, further comprising:
determining a first thickness of a first segment of the tubular;
determining a second thickness of a second segment of the tubular; and
generating, based on the second thickness being less than the first thickness, an alert for a user, the alert providing an indication of damage to the tubular.

19. The system of claim 15, further comprising:
determining a first impedance of a first segment of the cement layer;
determining a second impedance of a second segment of the cement layer; and
generating, based on the second impedance being less than the first impedance, an alert for a user, the alert providing an indication of a disruption to a bonding of the cement layer and the tubular.

20. The system of claim 15, wherein receiving, by the processing device, data associated with the vibration in the tubular further comprises:
receiving data associated with vibration in the tubular at a third location along a length of the tubular, the vibration in the tubular detected by a second interferometer positioned a distance apart relative to a length of the tubular from the at least one interferometer and positioned axially relative to the tubular from the at least one interferometer; and
receiving data associated with at least one radial distance between the at least one interferometer and the tubular.

* * * * *